United States Patent [19]

Janning, Jr. et al.

[11] 4,173,032
[45] Oct. 30, 1979

[54] BINARY CAPACITOR

[75] Inventors: Eugene A. Janning, Jr.; James H. Kreger, both of Cincinnati, Ohio

[73] Assignee: Xetron Corporation, Cincinnati, Ohio

[21] Appl. No.: 825,909

[22] Filed: Aug. 19, 1977

[51] Int. Cl.² .................. H01G 7/00; H01G 5/14
[52] U.S. Cl. ........................... 361/289; 361/292; 361/300
[58] Field of Search ............... 361/289, 295, 294, 292, 361/300; 336/30; 334/9, 10, 17, 84; 74/10 A; 323/80

[56] References Cited
U.S. PATENT DOCUMENTS

| 2,561,041 | 7/1951 | Arends | 361/289 |
| 2,562,263 | 7/1951 | Ehrlich | 361/294 |
| 2,729,746 | 1/1956 | Pan | 361/300 X |

FOREIGN PATENT DOCUMENTS 541712 12/1941 United Kingdom ................. 361/292

Primary Examiner—E. A. Goldberg
Attorney, Agent, or Firm—Irwin P. Garfinkle

[57] ABSTRACT

A binary capacitor consists of a piston having a metallized band on its periphery. The piston is movable between first and second positions within a cylinder which carries two spaced metallized bands. One of the positions of the piston defines a position of maximum capacitance, i.e. where the band on the piston overlaps both of the cylinder bands. The second position of the piston defines a position of minimum capacitance; i.e. where the piston band clears at least one of the cylinder bands. The piston is latched in its stable minimum and maximum states by fixed permanent magnets located at the ends of the piston in combination with soft iron slugs at the ends of the cylinder. The piston is moved by appropriately energizing electromagnetic coils wound over the soft iron slugs on the cylinder.

7 Claims, 5 Drawing Figures

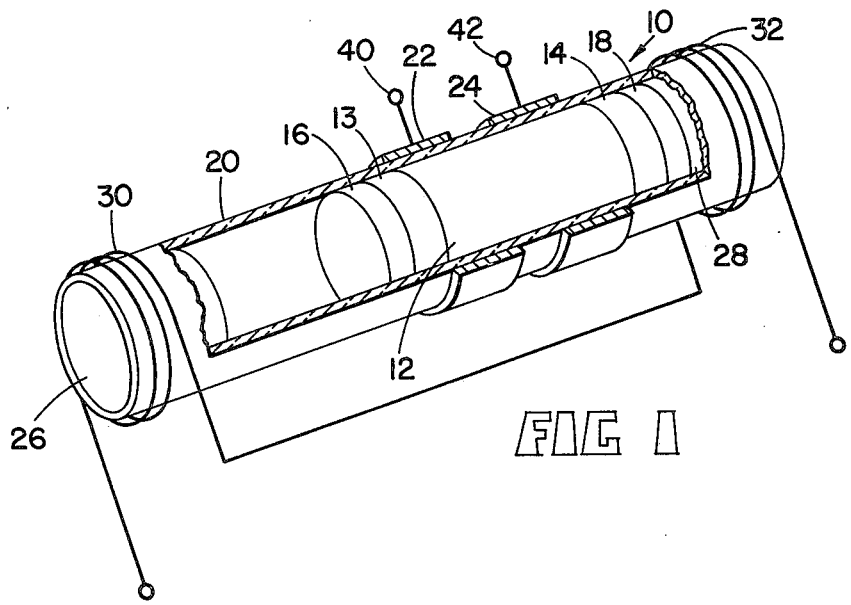
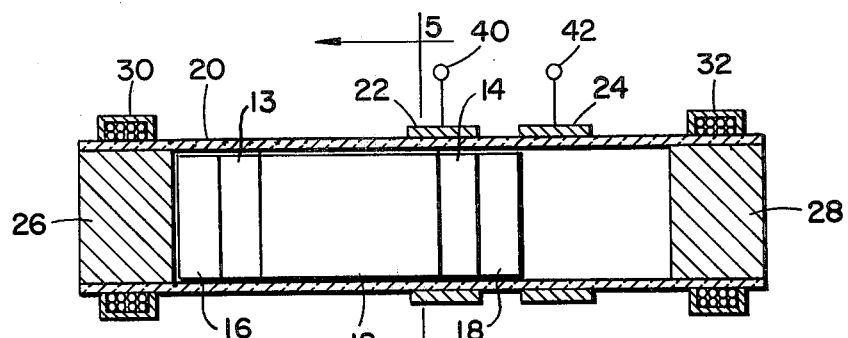
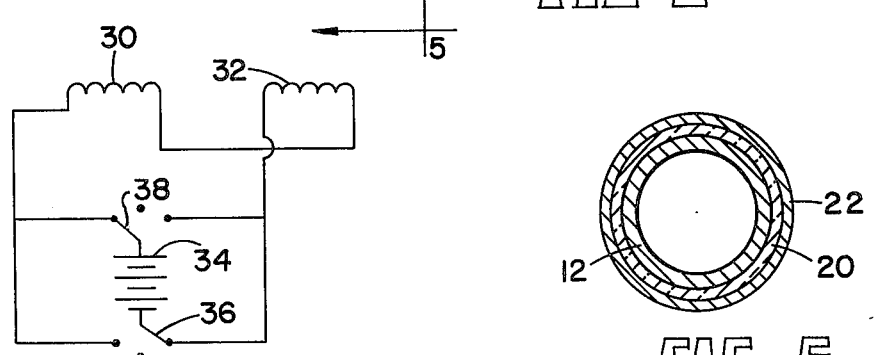
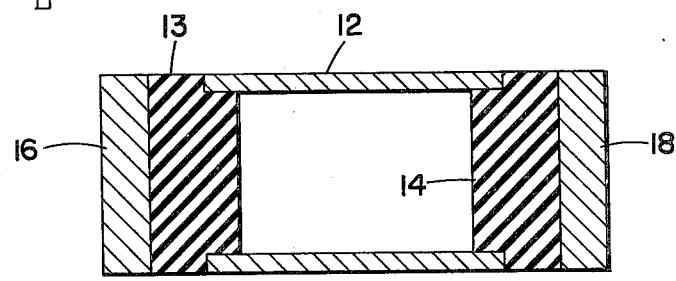

BINARY CAPACITOR

BACKGROUND OF THE INVENTION

Modern communications equipment requires the use of accurate, high speed, extremely linear elements useful in connection with digital tuning techniques. Many elements, such as voltage variable capacitors, saturable reactors, piezoelectric capacitors and switchable fixed elements, have been used before but each falls short in one or more ways in terms of speed, accuracy, linearity and power requirements. In accordance with the present invention, we provide a high-speed binary tuning element requiring very little power for tuning, and zero power for latching.

SUMMARY OF THE INVENTION

Basically, the invention comprises a piston-type capacitor wherein the piston is held in one of two stable states by magnetic latches. The piston is positioned inside of a glass cylinder and the effective capacitance of the device is the mutual capacitance between two spaced metallized bands on the cylinder wall and a metallized band on the piston. The piston travels between two fixed positions and is latched in one position or the other by means of a fixed permanent magnet at each end of the piston and a soft iron slug at each end of the cylinder. Maximum capacitance is attained when the piston band overlaps both cylinder bands and minimum capacitance is attained when the piston band completely clears one of the cylinder bands. The piston is held in one of two stable states by the latching permanent magnets coming in contact with the soft iron slug at the ends of the cylinder. Oppositely wound coils positioned around the soft iron slugs form a means for inducing a repelling magnetic field into one of the soft iron slugs, thus overcoming the intrinsic field of the permanent magnet, and for inducing an attracting force in the other slug. This causes the piston to repel to the opposite end where it is attracted and magnetically latched. A short pulse of current in the appropriate direction suffices to set the capacitance at one end or the other until retuning is desired. By using permanent magnets, no holding power is required.

DESCRIPTION OF THE DRAWINGS

FIG. 1 is a perspective view partly cut away and showing the general arrangement of a binary capacitor;

FIG. 2 is a longitudinal section of the capacitor shown in FIG. 1;

FIG. 3 is a section taken through the movable piston;

FIG. 4 is a schematic of the control for the electromagnets; and

FIG. 5 is a cross-sectional view taken at line 5—5 of FIG. 2.

DESCRIPTION OF THE ILLUSTRATED EMBODIMENT

Referring to the drawings, a binary capacitor 10 comprises a hollow conductive metal piston 12 which provides the equivalent of one conventional capacitor plate. Dielectric spacer discs 13 and 14 are bonded or otherwise secured to the opposite ends of the piston.

One permanent magnet disc 16 is bonded to the disc 13 (see FIG. 3). A second permanent magnet 18 is bonded at the opposite end of the disc 14. The dielectric discs 13 and 14 are positioned between the metal piston 12 and the magnets 16 and 18 to minimize piston travel, reduce stray capacitance and isolate the RF circuit from the actuating circuit.

The piston 12 is axially movable (see FIG. 1) within a hollow cylinder 20 comprising glass, quartz or other nonconducting material. Two fixedly spaced metallized conductive bands 22 and 24 are mounted on the cylinder 20 closer to one end of the cylinder than the other. A soft iron magnetic slug 26 closes one end of the hollow cylinder 20. A similar slug 28 closes the other end. The slugs 26 and 28 provide positive stops for the movable piston 12.

A coil 30 is wound on the cylinder 20 over the slug 26. A coil 32 is oppositely wound on the cylinder 20 over the slug 28. As seen in FIG. 4, the oppositely wound coils 30 and 32 are energized by means of a battery 34 appropriately connected to the coils through single-pole double-throw switches 36 and 38. In the switch position shown the coils are energized so that one of the electromagnets formed by the coils and slugs repels while the other attracts the permanent magnets 16 and 18. When the switches are moved to the opposite positions the electromagnetic forces are reversed. The electrical connections at terminals 40 and 42 to the capacitance portion of the device are stationary and are located entirely outside the cylinder 20.

When the coils 30 and 32 are de-energized, i.e. when the switches 36 and 38 are in neutral positions, the piston is latched into a fixed position either at the slug 26 or at the slug 28 by means of the permanent magnets 16 or 18, respectively. The piston 12 is moved by the electromagnetic force of the coils 30 and 32, one of which repels the piston while the other attracts and captures it. The power used to move the piston must be great enough to overcome the permanent magnets.

When the piston 12 is latched at the slug 28 (as shown in FIG. 1) the capacitance of the device is at a maximum since the piston 12 entirely overlaps both bands 22 and 24. When the piston is moved to the opposite slug (as shown in FIG. 2) the capacitance is at a minimum since there is little mutual capacitance between the piston 12 and the band 24. In the maximum capacitance position, capacitance C is equal to one-half the capacitance between each band 22, 24 and the piston 12 (assuming symmetrical metallization). In the minimum capacitance position the metallized portion of the piston completely clears the band 24 reducing the mutual capacitance between the bands to a low value due only to strays and fringing. The piston is held at the maximum or minimum position by latching permanent magnets at either end of the piston coming in contact with the soft iron slug. The soft iron slugs also form the cores of two solenoids.

The solenoids are poled such that when both are energized one is attracting its associated latching magnet while the other solenoid is repelling it, both acting to force the piston in one direction. When the current is reversed, both forces act in the opposite direction to drive the piston the other way. With this approach energy is required only during actuation. A short pulse of current in the appropriate direction suffices to latch the capacitance until resetting is desired. No holding power is required since this is accomplished by the permanent magnets.

In summary, the disclosed capacitive element is bistable and, although it has a movable element, all electrical connections are made to elements which are fixed. Thus, there is no need for contacts which could cause arcing if switched with signals applied at terminals 40 and 42. In addition, the capacitor is latched in both stable conditions without external power by means of the permanent magnets holding to the magnetically soft material. The change from one bistable state to the other is accomplished by means of two electromagnets, one of which serves to repel the piston from one latched position while the other attracts the piston to the other latched position. This arrangement provides maximum speed and positive stops in the latched position.

The device is capable of broad variations in design parameters by changing diameters and electrode length. By making the piston band substantially overlap both cylinder bands the device is made essentially vibration immune.

The device has its two capacitance terminals 40 and 42 electrically isolated from the control terminals. Moreover, it does not change capacitance value under the influence of applied RF signals; hence, it is nondistortion (intermodulation and harmonic) producing. The device can be arranged to change state by pulsing only one coil, both coils separately, or the two in series. With proper design of its two stable capacitance values the device can be assembled into an array of several units, either in series or parallel or combinations of both, which with proper pulsing of the control leads will permit a combined unit to have numerous stable states, thus permitting it to be used in a circuit to tune a wide frequency range.

When used as an array in a tuned circuit, poor tolerance components can be used but high accuracy tuning achieved by cataloging the actual values and using a read-only memory or other programming device to remember which units of the array must be in which state to give the desired high accuracy value.

Strong holding force is desirable so the unit will not change states under high G forces. Low power consumption in the coils is desirable for power critical applications. A proper balance between these opposing parameters may be achieved either by changing magnet size, changing magnet strength, or by changing gap sizing.

Moreover, the piston cylinder need not be round, as disclosed, but could be square, triangular, etc. It could also be planar.

Preferably, the axial length of the piston plate 12 should be greater than the combined lengths of the cylinder plates 22 and 24 and the space between them. This assures overlapping of the plates and maximum capacitance even under severe vibration conditions. However, the minimum length may be just greater than the gap distance if the device is made with close tolerances.

While the control circuit for the solenoids is shown for purposes of simplification and explanation as a mechanical switching system, it is contemplated that in most cases the control pulses will be electronically generated by means of well-known techniques.

We claim:

1. A binary capacitor comprising:
   a movable element having a conductive surface thereon;
   a fixed element having first and second spaced conductive surfaces thereon, said movable element being movable from a first position relative to the fixed element to a second position relative to the fixed element, the one conductive surface of the movable element overlapping both conductive surfaces of said second element when in said first position and not overlapping at least one of said surfaces when in said second position;
   means for selectively driving said movable element into said first or second position, said driving means comprising a permanent magnet device positioned on said movable element, oppositely poled electromagnets positioned at opposite ends of said second element, said electromagnets each having a coil wound on a slug of magnetic material, and being selectively energizable to repel or attract said permanent magnet device to drive said movable element into said first or second positions, said slugs being fixed in the path of travel of said permanent magnet device, whereby said slugs provide positive stops for said movable element, and said movable element is latched by said permanent magnet device to one or the other of said slugs.

2. The invention as defined in claim 1 wherein said movable and fixed elements are concentric.

3. The invention as defined in claim 2 wherein said fixed element is a hollow cylinder and said movable element is an axially movable piston in said cylinder, and wherein said permanent magnetic device comprises one permanent magnetic fixed to one end of said piston and a second permanent magnet fixed to the other end of said piston.

4. The invention as defined in claim 3 wherein said conductive surfaces on said cylinder are metal bands encircling said cylinder.

5. The invention as defined in claim 4 wherein the axial length of the surface on said piston is at least greater than the space between the bands on said cylinder, whereby in one position said piston band overlaps at least portions of both of said cylinder bands.

6. The invention as claimed in claim 3 wherein said slugs are fixed on the axis of said fixed cylinder at the opposite ends thereof and provide a positive stop in the line of travel of said piston.

7. The invention as defined in claim 6, and a dielectric spacer interposed between said piston and said permanent magnets.

* * * * *